(12) United States Patent
Gehrmann

(10) Patent No.: US 8,127,131 B2
(45) Date of Patent: Feb. 28, 2012

(54) SYSTEM AND METHOD FOR EFFICIENT SECURITY DOMAIN TRANSLATION AND DATA TRANSFER

(75) Inventor: Christian Gehrmann, Lund (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 851 days.

(21) Appl. No.: 12/100,523

(22) Filed: Apr. 10, 2008

(65) Prior Publication Data

US 2009/0259857 A1 Oct. 15, 2009

(51) Int. Cl.
*H04L 29/06* (2006.01)
*G06F 13/00* (2006.01)
*G06F 13/28* (2006.01)

(52) U.S. Cl. .................... 713/164; 711/163; 711/164
(58) Field of Classification Search .................. 713/164; 711/163–164
See application file for complete search history.

(56) References Cited

U.S. PATENT DOCUMENTS

| 5,982,891 | A | 11/1999 | Ginter et al. | |
|---|---|---|---|---|
| 6,640,304 | B2 | 10/2003 | Ginter et al. | |
| 6,795,905 | B1 * | 9/2004 | Ellison et al. | 711/163 |
| 6,976,175 | B2 | 12/2005 | England et al. | |
| 6,986,059 | B2 | 1/2006 | England et al. | |
| 7,100,199 | B2 | 8/2006 | Ginter et al. | |
| 7,124,302 | B2 | 10/2006 | Ginter et al. | |
| 7,133,845 | B1 | 11/2006 | Ginter et al. | |
| 7,185,159 | B2 * | 2/2007 | Beinet et al. | 711/163 |
| 7,305,534 | B2 * | 12/2007 | Watt et al. | 711/163 |
| 7,363,491 | B2 * | 4/2008 | O'Connor | 713/166 |
| 7,661,105 | B2 * | 2/2010 | Watt et al. | 718/100 |
| 7,681,044 | B2 * | 3/2010 | Goto | 713/190 |
| 7,836,320 | B2 * | 11/2010 | Harris | 713/324 |
| 8,001,390 | B2 * | 8/2011 | Hatakeyama | 713/190 |
| 2002/0073324 | A1 | 6/2002 | Hsu et al. | |
| 2004/0143714 | A1 * | 7/2004 | Watt | 711/163 |
| 2004/0143720 | A1 * | 7/2004 | Mansell et al. | 711/206 |

(Continued)

FOREIGN PATENT DOCUMENTS

WO 2005/091109 A1 9/2005

OTHER PUBLICATIONS

Alves et al., "TrustZone: Integrated Hardware and Software Security: Enabling Trusted Computing in Embedded Systems," Jul. 2004, pp. 1-12, ARM.
Wang et al. "Scalable Security Processor Design and Its Implementation." Asian Solid-State Circuits Conference, 2005, IEEE, Nov. 2005, pp. 513-516.

(Continued)

*Primary Examiner* — Christian Laforgia
(74) *Attorney, Agent, or Firm* — Coats & Bennett, P.L.L.C.

(57) ABSTRACT

A mobile UE includes a CPU, a secure DMA module, a secure cryptographic module, secure memory, and non-secure memory. The secure cryptographic module and secure memory allow access only by secure processes, including the secure DMA module. The CPU manages cryptographic keys and initializes DMA transfers in secure mode. The CPU executes the DMA transfers in non-secure mode. A first DMA transfer moves data encrypted in a first security domain to the secure cryptographic module, and moves clear text data to the secure memory. A second DMA transfer moves the clear text data to the secure cryptographic module, and data encrypted in a second security domain out of the secure cryptographic module. The data encrypted in the second security domain are transmitted to an external device. The secure memory protects the clear text data from being copied; only encrypted data is accessible by non-secure processes.

12 Claims, 4 Drawing Sheets

U.S. PATENT DOCUMENTS

| | | | |
|---|---|---|---|
| 2004/0148480 A1* | 7/2004 | Watt et al. | 711/163 |
| 2005/0097341 A1* | 5/2005 | Francis et al. | 713/189 |
| 2005/0114616 A1* | 5/2005 | Tune et al. | 711/163 |
| 2006/0288235 A1* | 12/2006 | Goto | 713/190 |
| 2007/0118880 A1* | 5/2007 | Mauro | 726/4 |
| 2007/0192830 A1* | 8/2007 | O'Connor | 726/2 |
| 2007/0195957 A1 | 8/2007 | Arulambalam et al. | |
| 2008/0172749 A1* | 7/2008 | Ko et al. | 726/27 |
| 2008/0250217 A1* | 10/2008 | Kershaw et al. | 711/163 |
| 2009/0172329 A1* | 7/2009 | Paver et al. | 711/163 |
| 2009/0172411 A1* | 7/2009 | Kershaw et al. | 713/189 |

OTHER PUBLICATIONS

"TCG Specification Architecture Overview." Specification rev. 1.3. Mar. 28, 2007. 54 pages. Trusted Computing Group, Inc. Beaverton, OR.

Menezes, Alfred, et al., eds. Handbook of Applied Cryptography. Fifth printing, Aug. 2001. CRC Press, Boca Raton, Fl. Electronic version accessed at http://cplus.about.com/gi/o.htm?zi=1/XJ&zT:=1&sdn=cplus&cdn=compute&tm=11&f=00&tt=14&bt=1&bts=1&zu=http://www.cacr.math.uwaterloo.ca/hac/index.html.

* cited by examiner

SYSTEM AND METHOD FOR EFFICIENT SECURITY DOMAIN TRANSLATION AND DATA TRANSFER

FIELD OF THE INVENTION

The present invention relates generally to cryptographic computing systems, and in particular to an efficient, secure intermediary translating encryption across security domains.

BACKGROUND

Security is an increasingly important consideration in the design of mobile User Equipment (UE). Prevention of fraud in the operation of the wireless network itself, enabling e-commerce from UE terminals, and the implementation of Digital Rights Management (DRM) to protect content such as audio and video, are a few examples of the compelling need for comprehensive security. This need is being addressed at the core level, as evidenced by the recent TrustZone® extensions to the ARM® processor architecture. TrustZone® is a combination of software and hardware extensions for the ARM® architecture that creates a secure execution environment for trusted code. A TrustZone® enabled CPU operates in one of two virtual processor modes, called worlds. One is the normal world and the other the secure world. These worlds operate independently of each other, and communicate using bank switched registers and caches for rapid context switches between the worlds. A status bit specifies which world is active, and controls access to external resources like Random Access Memory (RAM), Flash storage and peripheral devices.

Even though facilities such as the TrustZone® extensions allow rapid switches between secure and non-secure code execution, such context switches should be minimized for optimal performance. In some situations, switching between secure and non-secure execution environments may be required for every data packet. One example of such a situation is a mobile UE receiving encrypted (i.e., cipher text) data that is protected under a DRM scheme, where the UE passes the data to a separate media player or storage device. A secure CPU process in the UE handles the DRM rights object and content keys. However, a non-secure CPU process must download or stream the data to the external player or storage device, as the communications facilities are non-trusted code. Furthermore, if the data is transferred to the external player or storage device in non-encrypted form (i.e., clear text), the DRM may be thwarted as the content may easily be copied. Thus, the link from the UE to the external device must be secure (encrypted) as well. Where the external player does not support the same encryption scheme, algorithms, or formats as the DRM content owner, directly transferring the received cipher text data is not feasible. Even if the systems are compatible, the DRM may disallow the UE from transferring any content key the external device. Accordingly, the UE must first decrypt the received cipher text data into clear text form using the DRM key, and then re-encrypt the data using a different key for secure transfer to the external device. This is normally done on a per-packet basis, requiring the CPU to constantly switch between secure and non-secure modes.

SUMMARY

A mobile UE includes a CPU, a secure DMA module, a secure cryptographic module, secure memory, and non-secure memory. The secure cryptographic module and secure memory allow access only by secure processes, including the secure DMA module. The CPU manages cryptographic keys and initializes DMA transfers in secure mode. The CPU executes the DMA transfers in non-secure mode. A first DMA transfer moves data encrypted in a first security domain to the secure cryptographic module, and moves clear text data to the secure memory. A second DMA transfer moves the clear text data to the secure cryptographic module, and data encrypted in a second security domain out of the secure cryptographic module. The data encrypted in the second security domain are transmitted to an external device. The secure memory protects the clear text data from being copied; only encrypted data is accessible by non-secure processes. The two DMA transfers may be repeated, e.g., for each packet of data. The CPU is required to switch to secure mode only to manage keys and to initialize the DMA transfers; all encryption translation and data transfer is performed in non-secure mode. In one embodiment, the CPU, secure DMA module, secure cryptographic module, and secure memory are integrated in a System on Chip (SoC).

DETAILED DESCRIPTION

Figure 1:
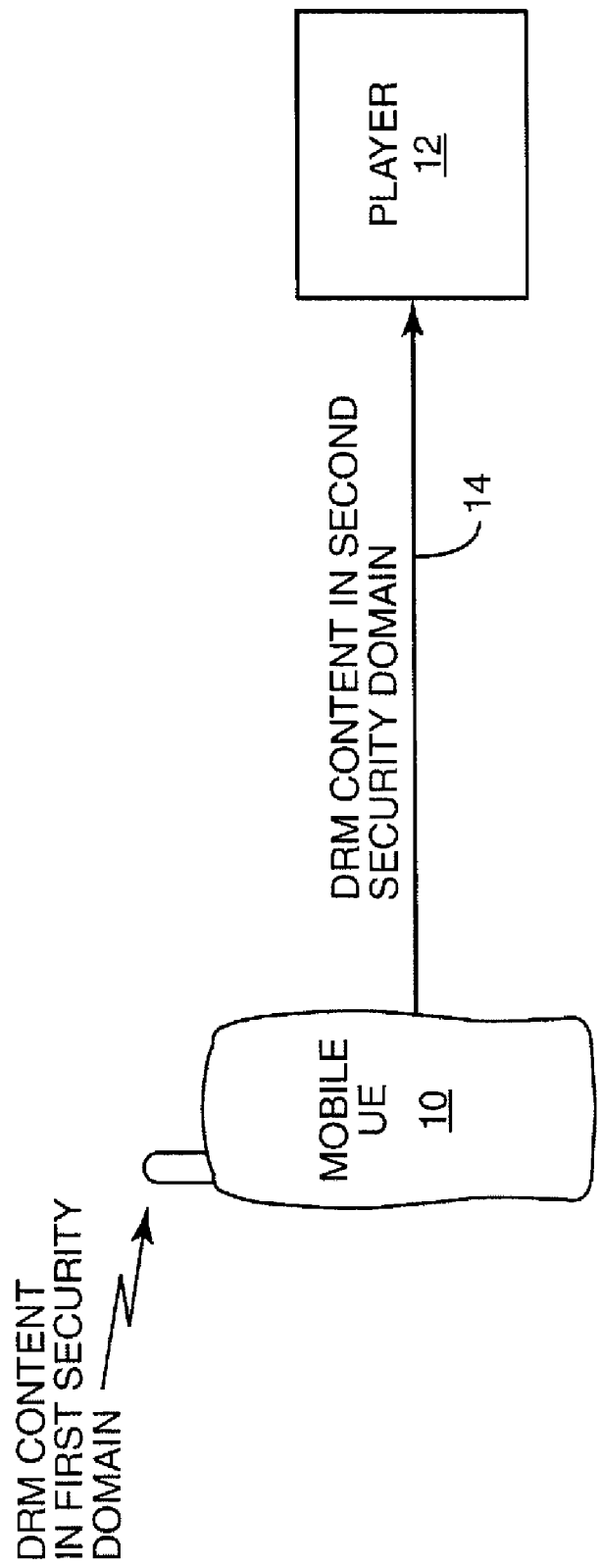
FIG. 1 is a functional block diagram of a mobile UE and attached, external player.

FIG. 1 depicts a representative mobile User Equipment (UE) 10 receiving DRM content in a first security domain—that is, encrypted according to a first encryption algorithm or protocol—over an air interface. The UE 10 transfers the DRM content in a second security domain to, e.g., an external player device 12, over a wired or wireless link 14. The content is encrypted on this link to preclude interception and potential copying, which would be possible if it were transferred in clear text form. In general, the DRM content transferred between the UE 10 and the external player 12 is encrypted in a security domain different from that received by the UE 10. For example, the external player 12 may not support the first security domain (DRM encryption), or the UE 10 may be prohibited from transferring DRM keys to the external player 12.

Figure 2:
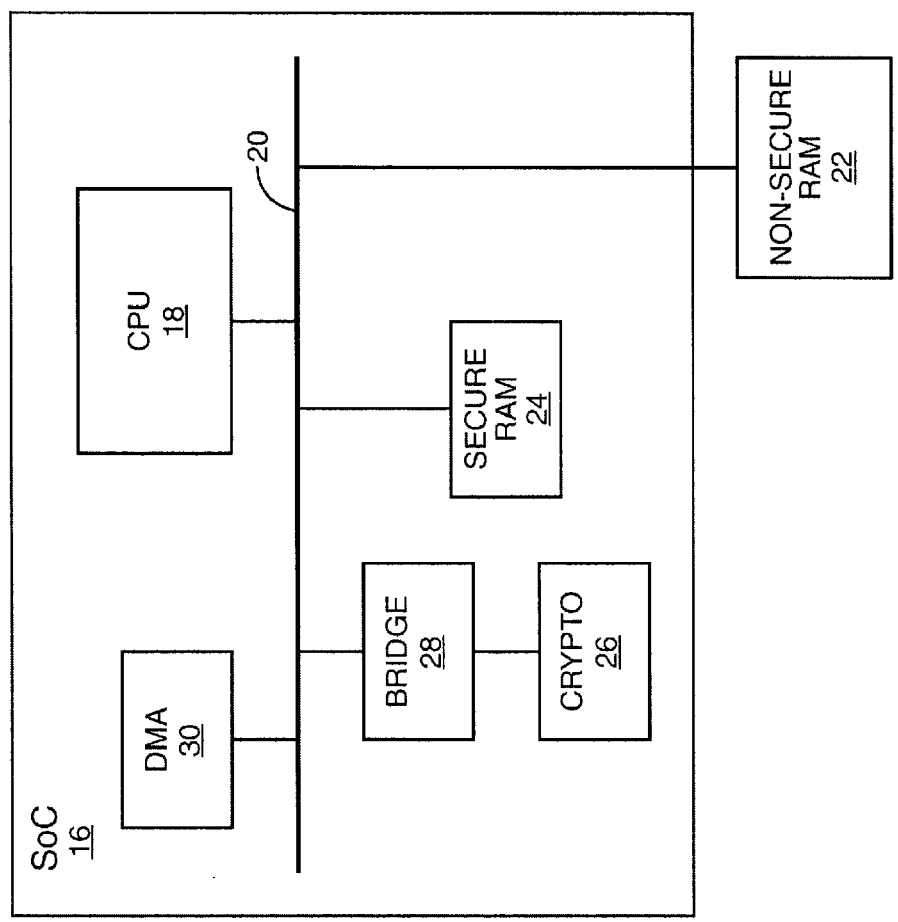
FIG. 2 is a functional block diagram of a processor system in the UE.

FIG. 2 depicts one embodiment of processor hardware within the UE 10 that supports the efficient translation of data from the first to the second security domain. In particular, the processor hardware arrangement enables the encryption translation with a minimum of processor mode switches between secure and non-secure modes.

In the embodiment depicted, the core hardware is highly integrated, comprising a "System on Chip" (SoC) 16. Included on the SoC 16 is a Central Processing Unit (CPU) 18, bus 20, secure memory 24, cryptographic module 26, secure bridge 28, and secure Direct Memory Access (DMA) module 30. Non-secure memory 22, residing off of the SoC 16, connects to the bus 20. In other embodiments, the functional modules may be discrete, or may be integrated in different combination(s) than depicted in FIG. 2.

The CPU 18 transfers data over the bus 20 to and from non-secure memory 22, such as Dynamic Random Access Memory (DRAM), Static RAM (SRAM), Read-Only Memory (ROM), and the like. Secure memory 24, for example an SRAM array, is integrated on the SoC 16. The secure memory 24 may only be accessed by the secure DMA module 30, and the CPU 18 in secure mode. Stated another way, only secure processes may access the secure memory 24 (where the secure DMA module 30 is recognized as a secure process). In particular, the secure memory 24 is not accessible by any device external to the SoC 16.

The cryptographic module 26 is optimized to encrypt/decrypt data autonomously of the CPU 18 (after being initialized and provisioned with the relevant cryptographic keys). The cryptographic module 26 may be a general-purpose cryptographic engine operative to encrypt/decrypt data according to a variety of protocols, or security domains. Alternatively, the cryptographic module 26 may be optimized to particular security domains. The cryptographic module 26 is secure, in that (like the secure memory 24) it may be accessed only by secure processes. In one embodiment, this protection is built into the cryptographic module 26. In another embodiment, as depicted in FIG. 2, a bridge module 28, interposed between the bus 20 and the cryptographic module 26, enforces security by blocking access to the cryptographic module 26 by all non-secure processes. In either case, the cryptographic module 26, and its bridge module 28, if present, are referred to together herein as the secure cryptographic module 26.

The secure DMA module 30 is operative to transfer data to and from the secure cryptographic module 26, autonomously of the CPU 18 (after being initialized and provisioned with the relevant DMA parameters, such as source and destination addresses and transfer count) in two-stage operations. First, the secure DMA module 30 reads data from a source address, which may comprise a memory address or a peripheral such as a radio receiver, and writes the data to the secure cryptographic module 26. When the secure cryptographic module 26 indicates that an encryption/decryption operation is complete (such as via sideband signaling to the secure DMA module 30), the secure DMA module 30 retrieves data from the secure cryptographic module 26 and writes it to a destination address, which may comprise a memory address or a peripheral such as a Universal Asynchronous Receiver/Transmitter (UART), Universal Serial Bus (USB) port, Bluetooth® transmitter, or the like. The bridge module 28 (or secure cryptographic module 26 in the absence of the bridge module 28), and the secure memory 24, recognize the secure DMA module 30 as a secure process and allow it to write and read data.

In operation, the CPU 18 enters a secure mode (i.e., executes a secure process) to manage the first and second security domain keys, load them into the secure cryptographic module 26, and initialize two secure DMA transfers. After that, the CPU enters a non-secure mode, and performs the security domain translation and data transfer by executing the DMA transfers and controlling communication peripherals. These actions may be repeated as necessary—for example, for each packet of content data—without the need for the CPU 18 to re-enter the secure mode.

Figure 3A:
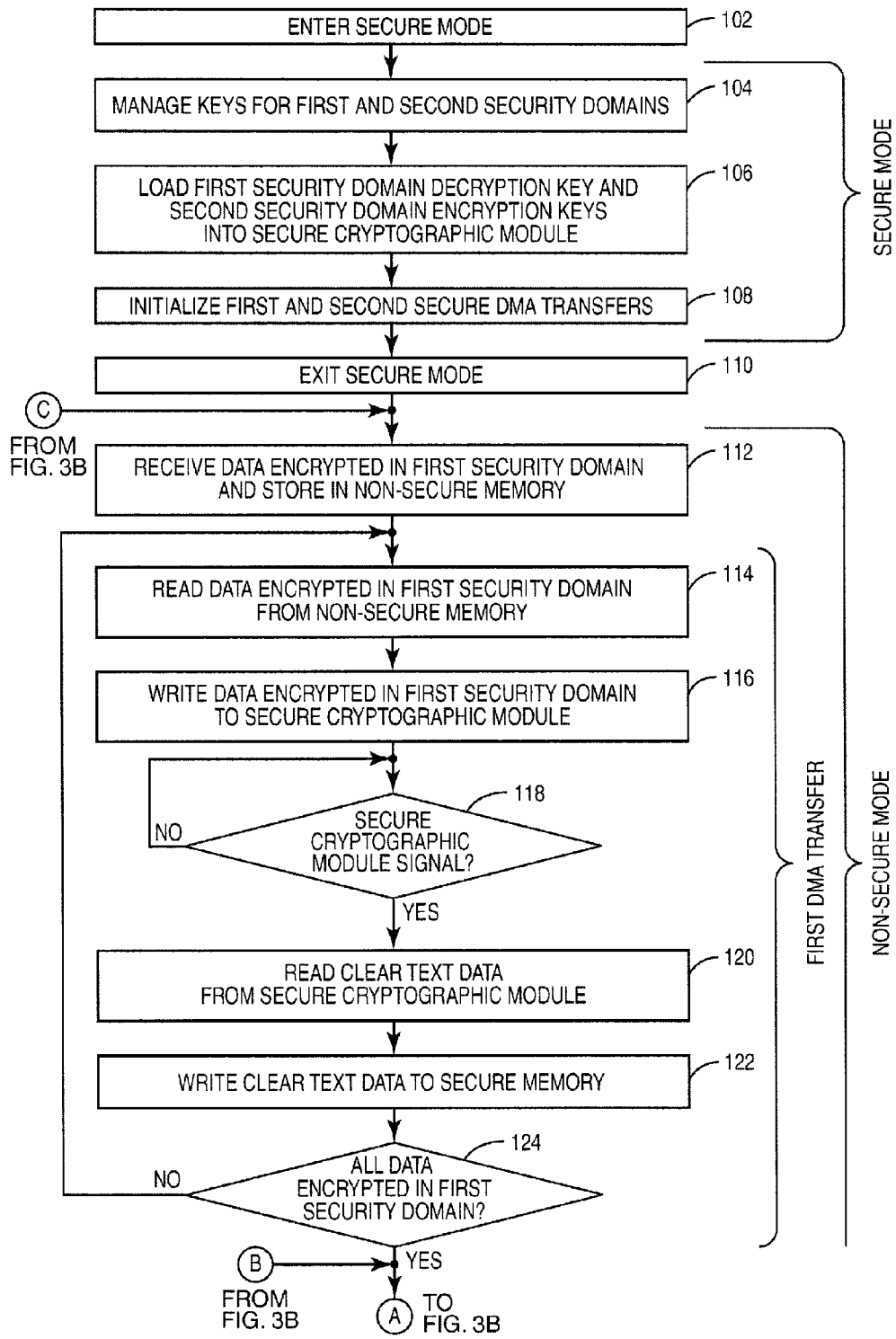
FIG. 3 is a flow diagram of a method of efficiently translating encrypted data between security domains while minimizing secure/non-secure mode switches.
Figure 3B:
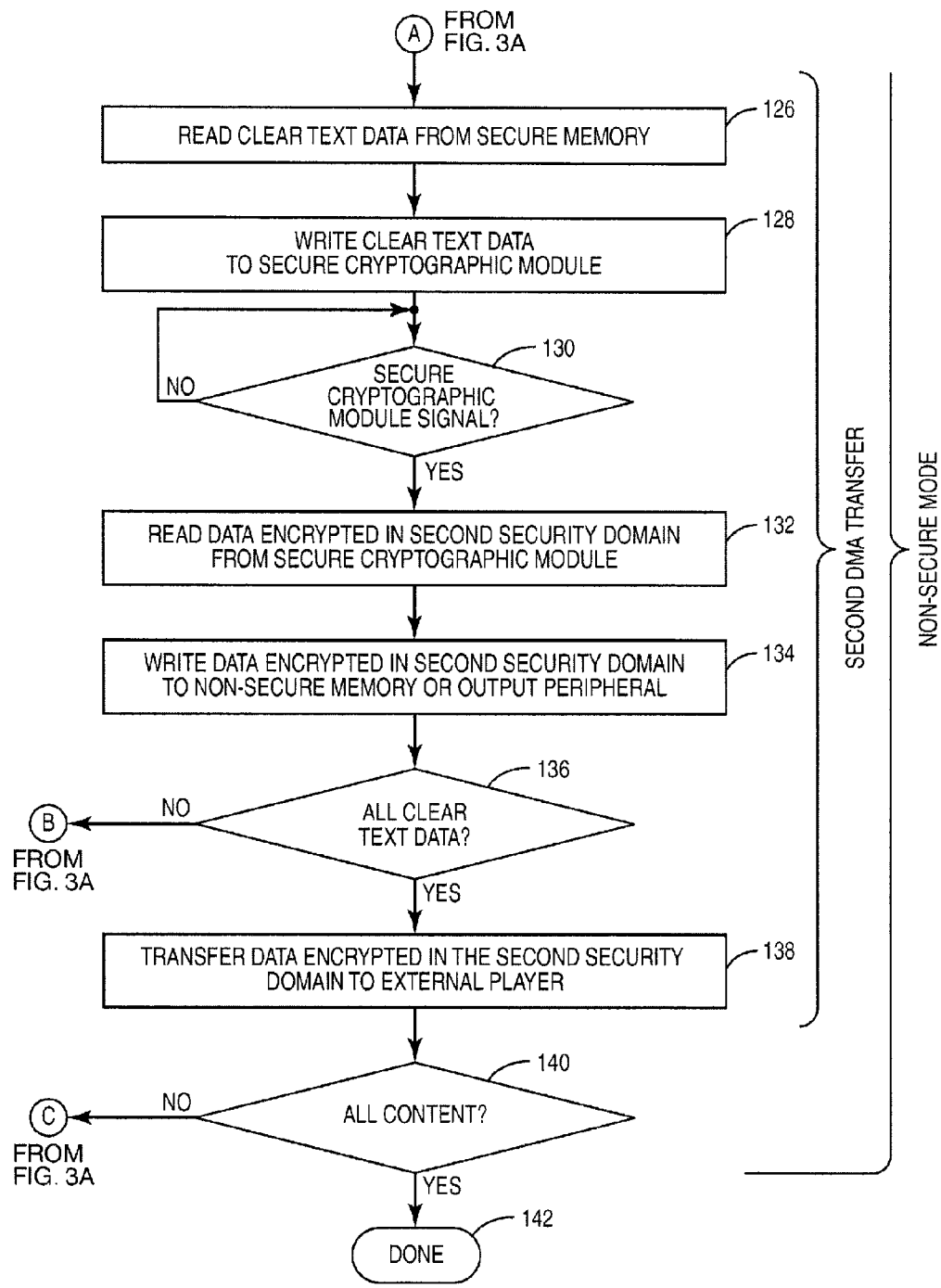

A detailed method 100 is described with reference to the flow diagram of FIG. 3. The CPU 18 enters secure mode (block 102), and manages keys for the first and second security domains (block 104). The CPU 18 may obtain one or both cryptographic keys from a secure location, such as via a secure air interface link to a trusted site, a key previously stored in secure memory 24, or the like. Alternatively, the CPU 18 may generate one or more cryptographic keys via a key derivation process, may obtain a public key over a non-secure link, or otherwise obtain at least a decryption key for the first security domain and an encryption key for the second security domain. The CPU 18 loads these cryptographic keys into the secure cryptographic module 26 (block 106). The CPU 18 initializes first and second secure DMA transfers, such as by writing source and destination addresses, transfer counts, and the like to the secure DMA 30. The CPU 18 then exits secure mode (block 110).

The UE 10 then receives data encrypted in the first security domain, and stores it in non-secure memory 22. In a typical application, this may correspond to a single packet of data. The CPU 18 then executes the first DMA transfer. As part of the first DMA transfer, the secure DMA module 30 reads a quantum of data encrypted in the first security domain from the non-secure memory 22 (block 114), and writes the encrypted data to the secure cryptographic module 26 (block 116). The secure cryptographic module 26 decrypts the data, and indicates completion of this task, such as by asserting a sideband signal to the secure DMA module 30 (block 118). In other embodiments, the secure cryptographic module 26 may assert an interrupt, set or clear a flag in a status register, or otherwise communicate completion of the decryption task. The secure DMA module 30 then reads clear text data from the secure cryptographic module 26 (block 120), and writes it to secure memory 24 (block 122). The first DMA transfer then repeats this process until all of the data encrypted in the first security domain has been decrypted, and the corresponding clear text stored in secure memory 24. The clear text data is protected from copying, as only secure processes (e.g., a secure DMA transfer or the CPU 18 in secure mode) may access the secure memory 24.

The CPU 18 next executes the second DMA transfer. As part of the second DMA transfer, the secure DMA module 30 reads a quantum of clear text data from the secure memory 26 (block 126), and writes it to the secure cryptographic module 26 (block 128). The secure cryptographic module 26 encrypts the clear text data into the second security domain, signaling the secure DMA module 30 upon completion of this task (block 130). The secure DMA module 30 then reads data encrypted in the second security domain from the secure cryptographic module 26 (block 132), and writes the encrypted data to non-secure memory 22 (block 134). The second DMA transfer repeats this process until all of the clear text data (block 136) has been encrypted in the second security domain, and stored in non-secure memory 22. The data encrypted in the second security domain is then transferred to the external player 12 (block 138), such as by writing it to a UART, USB port, Bluetooth® transmitter, or the like. The CPU 18 must perform this task in non-secure mode, since the device drivers are not trusted code.

If more encrypted content is to be received (block 140), the first and second DMA transfers are executed again, such as once for each packet of data to be translated. The method terminates (block 142) when all data have been received, translated, and transferred. Note that all of the steps to be repeated—receiving a new packet of data encrypted in the first security domain, decrypting the data and storing the clear text in secure memory 26, encrypting the clear text data in the second security domain, and transferring the data encrypted in the second security domain to the external player 12—are performed while the CPU is in non-secure mode (indeed, they are largely autonomous of the CPU, which may be performing other tasks at the time). The CPU only needs to enter secure mode once, to manage the cryptographic keys and initialize the DMA transfers. This system and method dramatically reduces the number of required mode changes by the CPU 18 between secure and non-secure modes, with concomitant decreases in overhead and savings in power consumption.

Those of skill in the art will readily recognize that several variations on the above-described method are within the scope of the present invention. For example, step 112—receiving data encrypted in the first security domain and storing it in non-secure memory 22—may be the first step executed. In this embodiment, the packet size is known a priori, and the DMA transfers can be initialized with a definite transfer count. Furthermore, one or both steps of reading encrypted data from non-secure memory 22 and storing it there (that is, blocks 114 and 134) may be omitted, and the corresponding DMA transfer initialized to read encrypted data directly from the source or write it directly to the destination, respectively. For example, the first DMA transfer may read quanta of data encrypted in the first security domain directly from a receiver in the UE 10, and/or the second DMA transfer may write quanta of data encrypted in the second security domain directly to a UART, USB port, Bluetooth® transmitter, or other interface to the external player 12. This embodiment may be preferred where data is continuously "streamed," or transferred in real time, to the UE 10.

In yet another embodiment, the secure cryptographic module 26 is operative to buffer data, and the two, two-stage DMA transfers described above are replaced with four conventional DMA transfers—(1) from non-secure memory 22 to the secure cryptographic module 26; (2) from the secure cryptographic module 26 to secure memory 24; (3) from the secure memory 24 to the secure cryptographic module 26; and (4) from the secure cryptographic module 26 to non-secure memory 22. This embodiment may allow use of existing DMA module designs, without the need to enable the two-stage operation and sideband signaling with the secure cryptographic module 26 for flow control (rather, the CPU 18 would manage data flow by sequencing the DMA transfers, such as in response to interrupts from the secure cryptographic module 26). In still another embodiment, a single, four-stage DMA operation may control all flow of data into and out of the secure cryptographic module 26. Those of skill in the art may determine the optimum trade-offs among the above embodiments, and others that readily suggest themselves, for the constraints of a given application or implementation, given the teachings of the present disclosure.

As used herein, a "security domain" refers to a particular encryption algorithm, system, mode, or protocol. Data "in" a security domain means the data is encrypted according to the domain's encryption algorithm, system, or protocol. As used herein, "cipher text" and "clear text" have the industry standard meanings of encrypted and unencrypted data, respectively, regardless of whether or not the data comprises or may be interpreted as text. As used herein, a "secure cryptographic module" is a cryptographic computational module that protects data from access by all non-secure processes, either inherently or via a bridge or other protective module. The secure cryptographic module may comprise a hardware circuit, a software module executed on a processor or Digital Signal Processor (DSP), or any combination of hardware, software, and firmware known in the art.

As used herein, "secure memory" is data storage that protects data from access by all non-secure processes, either inherently or via a bridge or other protective module. As used herein, "non-secure memory" is data storage that allows access by any process. As used herein, a secure DMA transfer is a DMA operation that qualifies as a secure process for the purpose of accessing the secure cryptographic module and secure memory. A secure DMA transfer is initialized, or "set up" by a processor in secure mode, but can be executed by a processor in non-secure mode. As used herein, "content" is a subset of "data," and refers to data representing video, audio, text, graphics, or other information that may protected under a DRM scheme.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method of transferring encrypted data from an external source to an external destination, by a processor selectively operated in either a secure mode or a non-secure mode comprising:
   in a secure mode,
      managing cryptographic keys for first and second security domains; and
      initializing a first secure Direct Memory Access (DMA) transfer into secure memory and a second secure DMA transfer from secure memory; and
   in a non-secure mode,
      receiving data encrypted in a first security domain from the external source;
      executing the first secure DMA transfer to move the encrypted data to a secure cryptographic module and clear text data to the secure memory;
      executing the second secure DMA transfer to move clear text data from the secure memory to the secure cryptographic module; and
      transferring data encrypted in the second security domain to the external destination.

2. The method of claim 1 wherein the non-secure mode steps are repeated for each of a plurality of successive packets of data.

3. The method of claim 1 further comprising, in non-secure mode, storing the received data encrypted in a first security domain in non-secure memory prior to executing the first secure DMA transfer.

4. The method of claim 3 wherein the first DMA transfer moves the encrypted data from non-secure memory to a secure cryptographic module and clear text data to the secure memory.

5. The method of claim 1 further comprising, in non-secure mode, storing data encrypted in the second security domain in non-secure memory prior to executing the first secure DMA transfer.

6. The method of claim 5 wherein the second secure DMA transfer moves clear text data from the secure memory to the secure cryptographic module and data encrypted in the second security domain from the secure cryptographic module to non-secure memory.

7. The method of claim 1 wherein managing cryptographic keys for first and second security domains comprises retrieving one of the cryptographic keys from a secure source.

8. The method of claim 1 wherein managing cryptographic keys for first and second security domains comprises deriving one of the cryptographic keys.

9. The method of claim 1 wherein the step of receiving data encrypted in a first security domain from the external source is performed prior to the processor entering secure mode.

10. A method of efficiently translating encrypted data from a first security domain to a second security domain by a processor selectively operated in either a secure mode or a non-secure mode, while minimizing the required switching between modes, comprising:
    in a secure mode,
       providing a decryption key operative in the first security domain;

providing an encryption key operative in the second security domain loading the first domain decryption key and second domain encryption key into a secure cryptographic module;

initializing a first secure Direct Memory Access (DMA) transfer from non-secure memory to the secure cryptographic module and from the secure cryptographic module to secure memory; and initializing a second secure DMA transfer from secure memory to the secure cryptographic module and from the secure cryptographic module to non-secure memory; and in a non-secure mode, receiving data encrypted in a first security domain and storing it in non-secure memory;

executing the first secure DMA transfer to decrypt the data from the first security domain;

executing the second secure DMA transfer to encrypt the data into the second security domain; and transferring data in the second security domain.

11. The method of claim 10 wherein the non-secure mode steps are repeated for each of a plurality of successive packets of data.

12. The method of claim 10 wherein the step of receiving data encrypted in a first security domain and storing it in non-secure memory is performed prior to the processor entering secure mode.

* * * * *